(12) United States Patent
Kim et al.

(10) Patent No.: US 12,644,170 B2
(45) Date of Patent: *Jun. 2, 2026

(54) Al—Fe-ALLOY PLATED STEEL SHEET FOR HOT FORMING, HAVING EXCELLENT TWB WELDING CHARACTERISTICS, HOT FORMING MEMBER, AND MANUFACTURING METHODS THEREFOR

(71) Applicant: POSCO CO., LTD, Pohang-si (KR)

(72) Inventors: Seong-Woo Kim, Gwangyang-si (KR);
Jin-Keun Oh, Gwangyang-si (KR);
Yeol-Rae Cho, Gwangyang-si (KR);
Hyeon-Jeong Shin, Incheon (KR)

(73) Assignee: POSCO Co., LTD, Pohang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,558

(22) Filed: Feb. 16, 2024

(65) Prior Publication Data

US 2024/0191329 A1 Jun. 13, 2024

Related U.S. Application Data

(62) Division of application No. 17/059,641, filed as application No. PCT/KR2018/006244 on May 31, 2018, now Pat. No. 11,939,651.

(51) Int. Cl.
*C22C 38/32* (2006.01)
*B23K 35/02* (2006.01)
(Continued)

(52) U.S. Cl.
CPC .......... *C22C 38/32* (2013.01); *B23K 35/0238* (2013.01); *B23K 35/3086* (2013.01);
(Continued)

(58) Field of Classification Search
CPC ................ B21D 22/022; B21D 35/006; B23K 2103/166; B23K 2103/20; B23K 35/0238;
(Continued)

(56) References Cited

U.S. PATENT DOCUMENTS 6,296,805 B1 10/2001 Laurent et al.
10,590,522 B2 * 3/2020 Oh .......................... C22C 38/00
(Continued)

FOREIGN PATENT DOCUMENTS

CN 1531604 9/2004
CN 103987868 8/2014
(Continued)

OTHER PUBLICATIONS

NPL: on-line translation of JP 2011137210 A1, Jul. 2011 (Year: 2011).*

(Continued)

*Primary Examiner* — Jie Yang
(74) *Attorney, Agent, or Firm* — MORGAN, LEWIS & BOCKIUS LLP

(57) ABSTRACT

Provided is an Al—Fe-alloy plated steel sheet for hot forming, having excellent TWB welding characteristics since excellent hardness uniformity of a TWB weld zone after hot forming is obtained by suitably controlling a batch annealing condition, after plating Al, such that an Al—Fe-alloy layer is formed; a hot forming member; and manufacturing methods therefor.

20 Claims, 3 Drawing Sheets

EQUATION 1

(51) Int. Cl.

| | |
|---|---|
| *B23K 35/30* | (2006.01) |
| *C21D 8/02* | (2006.01) |
| *C21D 8/0221* | (2026.01) |
| *C21D 9/46* | (2006.01) |
| *C22C 38/02* | (2006.01) |
| *C22C 38/04* | (2006.01) |
| *C22C 38/06* | (2006.01) |
| *C23C 2/02* | (2006.01) |
| *C23C 2/12* | (2006.01) |
| *C23C 2/26* | (2006.01) |
| *C23C 2/28* | (2006.01) |
| *C23C 2/40* | (2006.01) |
| *B23K 103/16* | (2006.01) |
| *B23K 103/20* | (2006.01) |

(52) U.S. Cl.

CPC ............. *C21D 8/02* (2013.01); *C21D 8/0226* (2013.01); *C21D 8/0236* (2013.01); *C21D 9/46* (2013.01); *C22C 38/02* (2013.01); *C22C 38/04* (2013.01); *C22C 38/06* (2013.01); *C23C 2/02* (2013.01); *C23C 2/0224* (2022.08); *C23C 2/12* (2013.01); *C23C 2/261* (2022.08); *C23C 2/28* (2013.01); *C23C 2/29* (2022.08); *C23C 2/40* (2013.01); *B23K 2103/166* (2018.08); *B23K 2103/20* (2018.08); *C21D 2211/001* (2013.01); *C21D 2211/002* (2013.01); *C21D 2211/005* (2013.01); *C21D 2211/008* (2013.01)

(58) Field of Classification Search

CPC ..... B23K 35/3086; B32B 15/012; C23C 2/02; C23C 2/0224; C23C 2/12; C23C 2/261; C23C 2/28; C23C 2/29; C23C 2/40; C22C 38/06; C22C 38/02

See application file for complete search history.

(56) References Cited

U.S. PATENT DOCUMENTS

| | | | | |
|---|---|---|---|---|
| 10,597,747 | B2 * | 3/2020 | Drillet | ...................... C23C 2/12 |
| 10,934,601 | B2 * | 3/2021 | Kim | ........................ C23C 2/024 |
| 11,939,651 | B2 * | 3/2024 | Kim | ...................... C21D 6/005 |
| 2009/0220815 | A1 | 9/2009 | Canourgues et al. | |
| 2013/0220490 | A1 | 8/2013 | Hayashi | |
| 2014/0227555 | A1 | 8/2014 | Kawata et al. | |
| 2014/0242415 | A1 | 8/2014 | Azuma et al. | |
| 2014/0255724 | A1 | 9/2014 | Yamanaka et al. | |
| 2015/0284861 | A1 | 10/2015 | Allely et al. | |
| 2016/0144456 | A1 | 5/2016 | Kim | |
| 2019/0003029 | A1 | 1/2019 | Oh et al. | |
| 2019/0010597 | A1 | 1/2019 | Kim et al. | |
| 2019/0271058 | A1 * | 9/2019 | Drillet | ...................... C23C 2/26 |
| 2019/0366686 | A1 | 12/2019 | Fuda | |
| 2020/0087747 | A1 | 3/2020 | Kim et al. | |
| 2020/0189233 | A1 | 6/2020 | Suzuki | |
| 2021/0155997 | A1 | 5/2021 | Ruthenberg et al. | |

FOREIGN PATENT DOCUMENTS

| | | |
|---|---|---|
| EP | 2 832 887 A1 | 2/2015 |
| EP | 3 290 200 A1 | 3/2018 |
| JP | 3405379 | 5/2003 |
| JP | 2004244704 | 9/2004 |
| JP | 2006219741 | 8/2006 |
| JP | 2008260967 | 10/2008 |
| JP | 2011137210 | 7/2011 |
| JP | 5463906 | 4/2014 |
| JP | 2015520797 | 7/2015 |
| KR | 10-2009-0005004 | 1/2009 |
| KR | 10-2013-0002230 | 1/2013 |
| KR | 10-2013-0034239 | 4/2013 |
| KR | 10-2015-0075277 | 7/2015 |
| KR | 10-2016-0007961 | 1/2016 |
| KR | 101696121 | 1/2017 |
| KR | 101858868 | 5/2018 |
| KR | 10-2018-0074292 | 7/2018 |
| WO | 2002/103073 A1 | 12/2002 |
| WO | 2017/111533 A1 | 6/2017 |
| WO | 2018/142534 A1 | 8/2018 |
| WO | 2019/002026 A1 | 1/2019 |

OTHER PUBLICATIONS

On-line translation of JP 2011-137210 A, Jul. 2011.

Chinese Office Action dated Jun. 24, 2022 issued in Chinese Patent Application No. 201880094086.5.

Japanese Office Action dated Dec. 22, 2021 issued in Japanese Patent Application No. 2020-566277.

European Search Report dated Mar. 31, 2021 issued in European Patent Application No. 18920561.0.

International Search Report dated Feb. 22, 2019 issued in International Patent Application No. PCT/KR2018/006244.

U.S. Notice of Allowance dated Nov. 20, 2023 issued in U.S. Appl. No. 17/059,641.

Extended European Search Report issued on Jun. 20, 2025 in European Patent Application No. 25158918.0 (Note: US2016-0144456A1 cited therein is already of record.).

\* cited by examiner

COMPARATIVE EXAMPLE (NO. 1)    COMPARATIVE EXAMPLE (NO. 6)

COMPARATIVE EXAMPLE (NO. 1)    COMPARATIVE EXAMPLE (NO. 6)

Al—Fe-ALLOY PLATED STEEL SHEET FOR HOT FORMING, HAVING EXCELLENT TWB WELDING CHARACTERISTICS, HOT FORMING MEMBER, AND MANUFACTURING METHODS THEREFOR

CROSS-REFERENCE OF RELATED APPLICATIONS

This application is a divisional patent application of U.S. patent application Ser. No. 17/059,641, filed on Nov. 30, 2020, which is the U.S. National Phase under 35 U.S.C. § 371 of International Patent Application No. PCT/KR2018/006244, filed on May 31, 2018, the disclosures of which applications are incorporated by reference herein.

TECHNICAL FIELD

The present disclosure relates to an Al—Fe alloy plated steel sheet for hot press forming having excellent TWB welding characteristics, a hot press formed part, and methods for manufacturing the same.

BACKGROUND ART

Recently, hot press formed parts having ultra-high strength have been widely applied to structural members of automobiles to improve fuel efficiency through reductions in the weight of automobiles and to protect automobile passengers. Furthermore, technologies for performing hot press forming using a tailor welded blank (TWB) having a combination of different materials or different thicknesses to absorb energy in collision have been proposed, and thus, various related studies have been conducted.

Patent Document 1 discloses such a typical technology related to hot press forming. According to the technology disclosed in Patent Document 1, an Al—Si plating steel sheet is heated to a temperature of 850° C. or more, and then a hot press forming process and a cooling process are performed such that a part having a martensite phase is formed to secure ultra-high strength, within the range of 1600 MPa or more, in tensile strength.

In Patent Document 1, a plating layer having aluminum (Al) as a main phase is formed. Since a plating layer and a base material are non-uniformly mixed during TWB welding, a portion having locally decreased hardness is present in a melted portion. Therefore, when a welding zone is deformed due to poor hardness thereof, fracturing may occur in the welding zone.

Patent Document 2 discloses a technology for addressing the above issue. To address such an issue occurring during TWB welding of an Al-plated steel sheet, Patent Document 2 is characterized in performing TWB welding after removing a portion of an Al plating layer in a welding zone before the TWB welding.

However, to commercially apply the technology disclosed in Patent Document 2, additional equipment is required to remove a portion of an Al plating layer before TWB welding. In addition, since the plating layer having a larger area than an actual welding zone is removed, a risk such as poor corrosion resistance is ultimately increased in the portion in which the plating layer is removed.

Accordingly, there is increasing demand for development of a plated steel sheet for hot press forming having excellent TWB welding characteristics without removal of a plating layer, a hot press formed part, and methods for manufacturing the same.

PATENT DOCUMENT (Patent Document 1) U.S. Pat. No. 6,296,805 B1
(Patent Document 2) Korean Patent Publication No. 10-2009-0005004

DISCLOSURE

Technical Problem

An aspect of the present disclosure is to provide an Al—Fe alloy plated steel sheet for hot press forming having excellent TWB welding characteristics, a hot press formed part using the steel sheet, and method of manufacturing the same.

Technical Solution

According to an aspect of the present disclosure, an Al—Fe alloy plated steel sheet for hot press forming having excellent TWB welding characteristics includes a base steel sheet including, by weight percentage (wt %), carbon (C): 0.1 to 0.5%, silicon (Si): 0.01 to 2.0%, manganese (Mn): 0.1 to 10%, phosphorus (P): 0.001 to 0.05%, sulfur (S): 0.0001 to 0.02%, aluminum (Al): 0.001 to 1.0%, nitrogen (N): 0.001 to 0.02%, a balance of iron (Fe), and unavoidable impurities, and an Al—Fe alloy layer disposed on the base steel sheet. The Al—Fe alloy layer includes, by wt %, aluminum (Al): 40 to 60%, silicon (Si): 2 to 10%, a balance of iron (Fe), and unavoidable impurities, and a fraction of an unalloyed phase is 1 area % or less.

According to another aspect of the present disclosure, a method of manufacturing an Al—Fe alloy plated steel sheet for hot press forming, having excellent TWB welding characteristics, may include heating a slab within a temperature range of 1000 to 1300° C., the slab including, by weight percentage (wt %), carbon (C): 0.1 to 0.5%, silicon (Si): 0.01 to 2.0%, manganese (Mn): 0.1 to 10%, phosphorus (P): 0.001 to 0.05%, sulfur (S): 0.0001 to 0.02%, aluminum (Al): 0.001 to 1.0%, nitrogen (N): 0.001 to 0.02%, a balance of iron (Fe), and unavoidable impurities, finishing hot rolling the heated slab within a temperature range of Ar3 to 1000° C. to obtain a hot-rolled steel sheet, cooling the hot-rolled steel sheet and coiling the cooled hot-rolled steel sheet at a temperature higher than Ms and less than 750° C., dipping and plating the coiled hot-rolled steel sheet in a plating bath including, by wt %, Si: 6 to 12%, Fe: 1 to 4%, a balance of Al, and unavoidable impurities, and batch-annealing the plated hot-rolled steel sheet to satisfy the following Equation 1, $$1 = 100000 * \sqrt{232.9 \times \left(t + 0.4 \times \frac{T}{HR}\right) \times \exp\left(\frac{-25860}{273 + T}\right)} = 20 \qquad \text{Equation 1}$$

where T denotes a heating temperature (° C.), t denotes maintenance time at a heating temperature (hours), and HR denotes a heating rate (° C./hour).

According to another aspect of the present disclosure, a hot press formed part having excellent TWB welding characteristics, manufactured by hot press-forming a tailor welded blank (TWB) manufactured by welding an Al—Fe alloy plated steel sheet of the present disclosure to a steel sheet having a thickness or strength different from a thickness or strength of the Al—Fe alloyed plate steel sheet, and a method of manufacturing the hot press formed part are provided.

The technical solutions to the above-mentioned problems do not fully enumerate all features of the present disclosure. Various features of the present disclosure and the resulting advantages and effects will be understood in more detail with reference to the following detailed examples.

Advantageous Effects

As set forth above, example embodiments may provide a plating steel sheet for hot press forming having excellent tailor welded blank (TWB) welding characteristics of a welding zone due to uniform hardness of the welding zone when a TWB is formed, a hot press formed part, and methods for manufacturing the same.

BEST MODE FOR INVENTION

Figure 1:
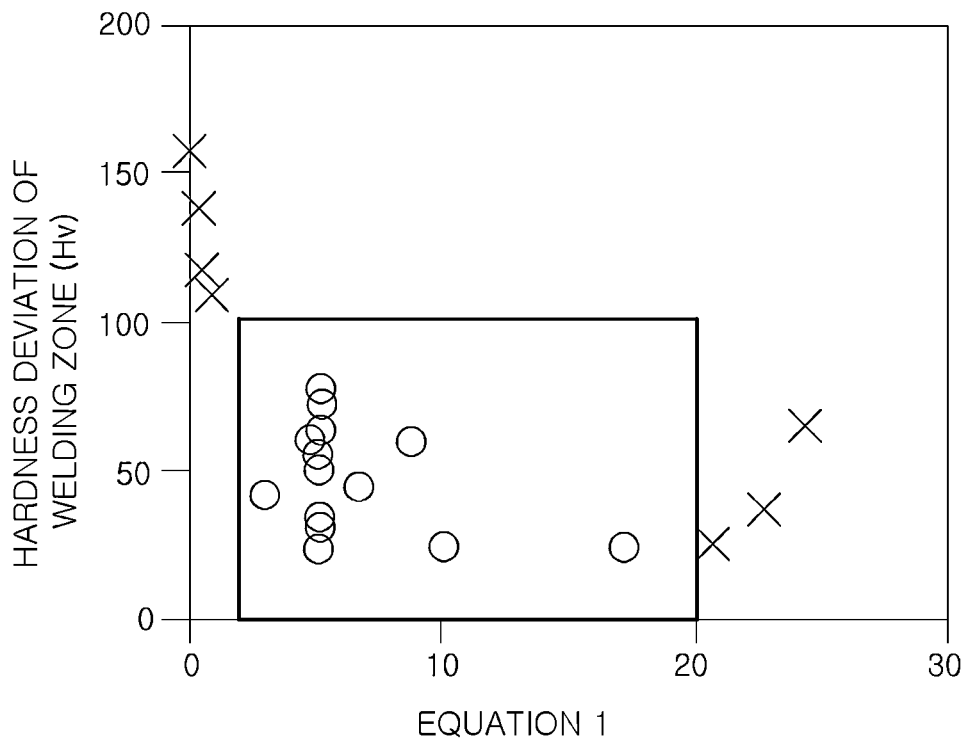
FIG. 1 is a graph illustrating a relationship between Equation 1 and hardness deviation of a TWB welding zone.

The present disclosure relates to a zinc-based plated steel sheet having excellent room-temperature aging resistance and bake hardenability and a method of manufacturing the same. Hereinafter, example embodiments of the present disclosure will be described below. Example embodiments of the present disclosure may be modified in various forms, and the scope of the present disclosure should not be construed as being limited to the embodiments described below. These embodiments are provided to complete the present disclosure and to allow those skilled in the art to understand the scope of the disclosure.

The present inventors have found that, when a tailor welded blank (TWB) is manufactured using an Al-plated steel sheet, TWB welding characteristics are deteriorated because hardness of a welding zone is not uniform and, when TWB is manufactured after removal of an Al plating layer to prevent the deterioration in TWB welding characteristics, introduction of additional equipment for removing a portion of the Al plating layer is required, and the plating layer having a larger area than an actual welding zone is removed to deteriorate corrosion resistance in a portion the plating layer is finally removed. Accordingly, the present inventors have made extensive and intensive studies to address the above issues.

As a result of the studies, the present inventors found that, after Al plating, an Al—Fe alloy layer may be formed by appropriately controlling batch annealing conditions, and thus, excellent hardness uniformity of a TWB welding zone may be achieved to improve TWB welding characteristics, and completed the present disclosure.

Al—Fe Alloy Plated Steel Sheet for Hot Press Forming Having Excellent TWB Welding Characteristics Hereinafter, an Al—Fe alloy plated steel sheet for hot press forming, having excellent TWB welding characteristics, according to an aspect of the present disclosure will be described in detail.

An Al—Fe alloy plated steel sheet for hot press forming, having excellent TWB welding characteristics, according to an aspect of the present disclosure includes a base steel sheet including, by weight percentage (wt %), carbon (C): 0.1 to 0.5%, silicon (Si): 0.01 to 2.0%, manganese (Mn): 0.1 to 10%, phosphorus (P): 0.001 to 0.05%, sulfur (S): 0.0001 to 0.02%, aluminum (Al): 0.001 to 1.0%, nitrogen (N): 0.001 to 0.02%, a balance of iron (Fe), and unavoidable impurities, and an Al—Fe alloy layer disposed on the base steel sheet. The Al—Fe alloy layer includes, by wt %, aluminum (Al): 40 to 60%, silicon (Si): 2 to 10%, a balance of iron (Fe), and unavoidable impurities, and a fraction of an unalloyed phase is 1 area % or less.

First, an alloy composition of a base steel sheet according to the present disclosure will be described in detail. Hereinafter, unless otherwise specified, the content of each element means weight percentage (wt %).

C: 0.1 to 0.5%

Carbon (C) may be an essential element for increasing strength of a heat treatment member. When the content of C is less than 0.1%, it may be difficult to secure sufficient strength. When the content of C is greater than 0.5%, strength of a hot-rolled material is so high that cold rollability is may be significantly deteriorated when the hot-rolled material is cold-rolled and spot weldability may be significantly deteriorated.

Therefore, the content of C content may be, in detail, 0.1 to 0.5%. A more detailed upper limit of the content of C may be 0.45%. An even more detailed upper limit may be 0.4%.

Si: 0.01 to 2.0%

Si may be added as a deoxidizer in steelmaking. Si may be added not only to suppress formation of a carbide, most affecting the strength of the hot press formed part, but also to enrich carbon to grain boundaries of martensite lath after formation of martensite to secure retained austenite in hot press forming.

When the content of Si is less than 0.01%, the above effect may not be expected to be obtained and steel cleanness may not be secured. In addition, excessive costs may be incurred. On the other hand, when the content of Si is greater than 2.0%, Al platability may be significantly deteriorated. Therefore, an upper limit of the content of Si may be, in detail, 2.0% and, in more detail, 1.5%.

Mn: 0.1 to 10%

Mn needs to be added not only to ensure a solid solution strengthening effect, but also to decrease a critical cooling rate for securing martensite in the hot press formed part.

When the content of Mn is less than 0.01%, there may be a limitation in obtaining the above effect. On the other hand, when the content of Mn is greater than 10%, the strength of a steel sheet is significantly increased, before a hot press forming process, to cause an increase in costs and to deteriorate spot weldability. Therefore, an upper limit of the content of Mn may be, in detail, 10%, in more detail, 9.0%, and in even more detail, 8.0%.

P: 0.001 to 0.05%

P is present as an impurity. Excessive costs may be incurred to control the content of P to be less than 0.001%. When the content of P is greater than 0.05%, weldability of a hot press formed part may be significantly reduced. Therefore, an upper limit of the content of P may be, in detail, 0.05% and, in more detail, 0.03%.

S: 0.0001 to 0.02%

S is present as an impurity. Excessive costs may be incurred to control the content of S to be less than 0.0001%. When the content of S is greater than 0.02%, the ductility, impact characteristics, and weldability of the hot press formed part may be deteriorated. Therefore, an upper limit of the content of S may be, in detail, 0.02% and, in more detail, 0.01%.

Al: 0.001 to 1.0%

Al is an element serves as a deoxidizer during steelmaking, together with Al, to increase cleanness of steel.

When the content Al is less than 0.001%, it may be difficult to obtain the above effect. When the content of Al is greater than 1.0%, a heating temperature needs to be further increased due to an excessive increase in temperature of Ac3.

N: 0.001 to 0.02%

N is present as an impurity. Excessive manufacturing costs may be incurred to control the content of N to be less than 0.001%. When the content of N is greater than 0.02%, cracking may occur in a slab continuous casting process and impact characteristics may be deteriorated.

A balance of the present disclosure is iron (Fe). However, unintentional impurities may be inevitably incorporated from raw materials or the surrounding environment in a general manufacturing process. Thus, the inclusion of such impurities cannot be ruled out. Since these impurities will be apparent to those skilled in the general manufacturing process, descriptions thereof will not be specifically provided in the present disclosure.

The base steel sheet according to the present disclosure may further include at least one of chromium (Cr) and molybdenum (Mo) in total of 0.01 to 4.0 wt %, other than the above-described elements.

Cr and Mo are elements contributing to improvement of hardenability through a precipitation strengthening effect and refinement of grains. When the sum of the content of at least one of Cr and Mo is less than 0.01%, it may be difficult to obtain the above effect. When the sum of at least one of Cr and Mo is greater than 4.0%, the above effect may be saturated, and deterioration in weldability and an increase in costs may occur.

In addition, the base steel sheet according to the present disclosure may further include at least one of titanium (Ti), niobium (Nb), and vanadium (V) in total of 0.001 to 0.4 wt %.

Ti, Nb, and V are elements forming fine precipitates to contribute to improvement of strength of the hot press formed part, stability of retained austenite resulting from the refinement of grains, and improvement of impact toughness. When the sum of one at least one of Ti, Nb, and V is less than 0.001%, not only the above effect may be saturated, but also an increase in costs may occur.

In addition, boron (B) may be further included in an amount of 0.0001 to 0.01%.

B is an element which may improve hardenability even when added in a small amount and may segregate to prior austenite grain boundaries to inhibit brittleness of the hot press formed part caused by grain boundary segregation of P and/or S. When the content of B is less than 0.0001%, it may be difficult to obtain the above effect. When the content of B is greater than 0.01%, the effect may be saturated and brittleness may occur in hot rolling. Therefore, an upper limit of the content of B may be, in detail, 0.01% and, in more detail, 0.005%.

A microstructure of the base steel sheet is not necessarily limited but may include, by an area fraction, for example, 20% or less of pearlite, 10% or less of martensite, 10% or less of spheroidized carbide 10% or less, and a balance of ferrite.

Hereinafter, the Al—Fe alloy layer formed on a surface of the base steel sheet according to the present disclosure will be described in detail.

The Al—Fe alloy layer may include, by wt %, Al: 40 to 60%, Si: 2 to 10%, and a balance of Fe and inevitable impurities, and a fraction of an unalloyed phase is 1 area % or less.

When the fraction of the unalloyed phase is greater than 1 area %, it refers to the presence of a low-melting-point Al phase. Such a low-melting-point Al phase may remain as an Al-enriched phase in a welding zone during TWB welding, and may form a low-hardness phase after hot press forming, and thus, may increase a hardness deviation of the TWB welding zone of the hot press formed part to deteriorate welding zone characteristics.

Al: 40 to 60%

When the content of Al in the Al—Fe alloy layer is greater than 60%, an Al-enriched phase may remains in the TWB welding zone. When the content of Al in the Al—Fe alloy layer is less than 40%, corrosion resistance of a final hot press formed part may be deteriorated.

Si: 2 to 10%

The content of Si of the plating layer may be, in detail, 2 to 10%. An Al—Fe plating layer may have various phases depending on the contents of Al, Si, and Fe. A Si-containing phase may have an effect to inhibit delamination of the plating layer, but may deteriorate spot weldability. When the content of Si is less than 2%, formation of the Si-containing phase may be insufficient, and thus, delamination may easily occur in the plating layer. When the content of Si is greater than 10%, resistance of the plating layer may be significantly increased to deteriorate the spot weldability.

In this case, the Al—Fe alloy layer may include a diffusion layer, disposed on the base steel sheet and constituting a layer while including Si in an amount of 0.5 to 12.0 wt %, and an intermediate layer disposed in the Al—Fe alloy layer and constituting a layer while including Si in an amount of 3.0 to 20.0 wt %. A sum of average thicknesses of the diffusion layer and the intermediate layer may be 1.0 to 10 μm.

When the sum of the thicknesses of the diffusion layer and the intermediate layer is less than 1.0 μm, delamination may easily occur in the plating layer. When the sum of the thickness of the diffusion layer and the intermediate layer is greater than 10 μm, resistance of the plating layer may be increased to deteriorate spot weldability. Therefore, the sum of the thicknesses of the diffusion layer and the intermediate layer may be, in detail, 1.0 to 10 μm and, in more detail, 2.0 to 10 μm.

Figure 4:
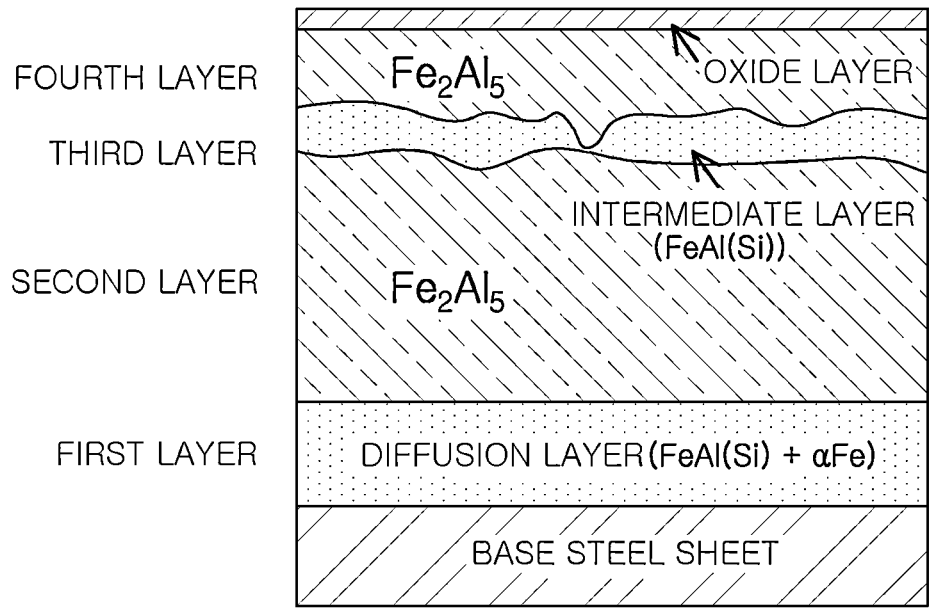
FIG. 4 is a schematic cross-sectional view of an Al—Fe alloy plated steel sheet according to an example embodiment of the present disclosure.

For example, as illustrated in FIG. 4, a schematic view of the Al—Fe alloy plated steel sheet of the present disclosure, the Al—Fe alloy plated steel sheet may include a diffusion layer, a layer in which $Fe_2Al_5$ is mainly contained, an intermediate layer, and a layer in which $Fe_2Al_5$ is mainly contained, which are sequentially formed from a surface of the base steel sheet. The diffusion layer may include FeAl (Si) and αFe as main components, and Si may be included therein in an amount of 0.5 to 12.0 wt %. The intermediate layer may include FeAl(Si) as a main component, and Si may be included therein in an amount of 3.0 to 20.0 wt %. Since FeAl(Si) has lower hardness than other phases, FeAl (Si) may inhibit delamination of the plating layer but may deteriorate spot weldability.

In addition, an oxide layer having a thickness of 2 μm or less may be formed on the Al—Fe alloy layer. When the thickness of the oxide layer is greater than 2 μm, spot weldability may be deteriorated. The thickness of the oxide layer refers to a thickness a point in which a concentration of oxygen is 10% in the glow discharge spectrometer (GDS) analysis.

The Al—Fe alloy layer may have a thickness of 10 to 60 μm.

When the Al—Fe alloying layer has a thickness less than 10 μm, it may be difficult to secure corrosion resistance. When the Al—Fe alloying layer has a thickness greater than 60 μm, spot weldability may be deteriorated and manufacturing costs may be increased.

Method of Manufacturing Al—Fe Alloy Plated Steel Sheet for Hot Press Forming Having Excellent TWB Welding Characteristics Hereinafter, a method of manufacturing an Al—Fe alloy plated steel sheet for hot press forming, having excellent TWB welding characteristics, according to another aspect of the present disclosure will be described in detail.

A method of manufacturing an Al—Fe alloy plated steel sheet for hot press forming, having excellent TWB welding characteristics, may include heating a slab satisfying the above-mentioned alloy composition within a temperature range of 1000 to 1300° C., finishing hot rolling the heated slab within a temperature range of Ar3 to 1000° ° C. to obtain a hot-rolled steel sheet, cooling the hot-rolled steel sheet and coiling the cooled hot-rolled steel sheet at a temperature higher than Ms and less than 750° C., dipping and plating the coiled hot-rolled steel sheet in a plating bath including, by wt %, Si: 6 to 12%, Fe: 1 to 4%, a balance of Al, and unavoidable impurities, and batch-annealing the plated hot-rolled steel sheet to satisfy the following Equation 1, $$1 = 100000 * \sqrt{232.9 \times \left(t + 0.4 \times \frac{T}{HR}\right) \times \exp\left(\frac{-25860}{273 + T}\right)} = 20 \quad \text{Equation 1}$$

where T denotes a heating temperature (° C.), t denotes maintenance time at a heating temperature (hours), and HR denotes a heating rate (° C./hour).

Hereinafter, a detail description of each operation will be provided.

Slab Heating

The slab, satisfying the above-described alloy composition, is heated to a temperature within the range of 1000 to 1300° C.

When the slab heating temperature is lower than 1000° C., it may be difficult to homogenize a structure of the slab. When the slab heating temperature is higher than 1300° C., an oxide layer may be excessively formed and manufacturing costs may be increased.

Hot Rolling

The heated slab may be finishing hot-rolled at temperature of Ar3 to 1000° ° C. to obtain a hot-rolled steel sheet.

When the finishing hot-rolling temperature is lower than Ar3, two-phase region rolling is likely to be performed. Therefore, a mixed grain structure may be formed on a surface layer and it may be difficult to control a plate shape. On the other hand, when the finishing hot-rolling temperature is higher than 1000° C., crystal grains may be coarsened.

8

Cooling and Coiling

The hot-rolled steel sheet may be cooled and coiled at temperature higher than Ms and less than 750° C.

When the coiling temperature is lower than or equal to a martensite transformation initiation temperature (Ms temperature), strength of a hot-rolled material may be increased to be so high that it may be difficult to perform cold rolling. When the coiling temperature is higher than 750° C., a thickness of the oxide layer may be excessively increased to make it difficult to perform surface pickling.

Plating

The coiled hot-rolled steel sheet may be plated by dipping in a plating bath including, by wt %, Si: 6 to 12%, Fe: 1 to 4%, a balance of Al, and unavoidable impurities.

When the content of Si is less than 6%, fluidity of the plating bath may be reduced to make it difficult to form a uniform plating layer. When the content of Si is greater than 12%, a melting temperature of the plating bath may be increased, so that it is necessary to increase a management temperature of the plating bath. Fe may be dissolved in the plating bath from the steel sheet during the plating to be present in the plating bath. To maintain the content of Fe in the plating bath at less than 1%, excessive manufacturing costs may be incurred to dilute the dissolved Fe. When the content of Fe is greater than 4%, a FeAl compound called dross in the plating bath may be easily formed to deteriorate plating quality. Therefore, the content of Fe needs to be managed to be 4% or less.

In this case, the plating may be performed such that plating amount is 30 to 130 g/m² based on one surface.

The above amount of plating is set for the following reasons. When the amount of plating is less than 30 g/m² based on one surface, it may be difficult to secure the corrosion resistance of the hot press formed part. When the amount of plating is less than 130 g/m² based on one surface, manufacturing costs may be increased due to an excessive coating amount and it may be difficult to achieve uniform coating amount in entire width and length directions of a coil.

In this case, the plating may further include cold rolling the coiled hot-rolled steel sheet, before the plating, to obtain a cold-rolled steel sheet before the plating.

The plating may be performed without performing cold rolling, but cold rolling may be performed to precisely control a thickness of the steel sheet. For example, cold rolling may be performed at a reduction ratio of 30 to 80% to obtain a predetermined target thickness.

The method may further include heating the coiled hot-rolled steel sheet to a temperature within the range of 400 to 700° ° C. to be maintained for an hour to 100 hours, before the cold rolling.

The method may further include continuously annealing the cold-rolled steel sheet at a temperature within the range of 700 to 900° C., after the cold rolling. This is aimed at, after cold rolling, recrystallizing a work-hardened structure to secure strength and physical properties appropriate to a subsequent manufacturing process.

Batch Annealing

The plated hot-rolled steel sheet is batch-annealed to satisfy the following equation 1.

$$1 = 100000 * \sqrt{232.9 \times \left(t + 0.4 \times \frac{T}{HR}\right) \times \exp\left(\frac{-25860}{273 + T}\right)} = 20 \quad \text{Equation 1}$$

where T denotes a heating temperature (C), t denotes maintenance time at a heating temperature (hours), and HR denotes a heating rate (° C./hour).

In a state in which only Al is plated before the batch annealing, the plating layer has a structure in which Al is a main phase and Al—Si eutectic phases are distributed. However, various phases, in which the content of Fe in the plating layer is gradually increased through alloying with Fe during the batch annealing, may be formed. Due to the formation of the various phases, it may be difficult to find an accurate phase. However, as described above and as illustrated in FIG. 4, the plating layer may include a diffusion layer, a layer in which $Fe_2Al_5$ is mainly contained, an intermediate layer, and a layer in which $Fe_2Al_5$ is mainly contained, which are sequentially formed from a surface of the base steel sheet. The diffusion layer may include FeAl (Si) and αFe as main components, and Si may be included therein in an amount of 0.5 to 12.0 wt %. The intermediate layer may include FeAl(Si) as a main component, and Si may be included therein in an amount of 3.0 to 20.0 wt %.

When a value of Equation 1 is less than 1, only an Al layer may remain on an outermost layer due to deficiency of the batch annealing. After hot press forming, the Al layer may non-uniformly remain in a welding zone during TWB welding because a low-melting-point Al phase is present in the plating layer. Accordingly, after finishing hot press forming, the Al layer may remain as a low-hardness phase in the welding zone, resulting in poor hardness of the welding zone.

On the other hand, when the value of Equation 1 is greater than 20, spot weldability may be deteriorated after the hot press forming as the sum of the average thicknesses of the diffusion layer and the intermediate layer are increased.

In this case, a heating rate during the batch annealing may range from 1 to 500° C./hour, a heating temperature may range from 450 to 750° C., and maintenance time may range from 1 to 100 hours.

When the heating rate is less than 1° C./hour, oxides may be excessively formed on a surface of the plating layer due to oxygen present in an atmosphere of a heating furnace as an impurity. Accordingly, it may be difficult to secure spot weldability after the hot press forming, and productivity may be significantly reduced. On the other hand, when the heating rate is greater 500° C./hour, a partially unalloyed Al layer may remain on the surface of the plating layer. The unalloyed Al layer may non-uniformly remains as a low-melting-point phase in the weld zone during the TWB welding. After the hot press forming, the Al layer may remain as a low-hardness phase in the welding zone, resulting in poor hardness of the welding zone.

When the heating temperature is lower than 450° C., alloying may be insufficiently performed on a surface layer of the plating layer, resulting in poor hardness of the welding zone, as described above. On the other hand, when the heating temperature is higher than 750° C., oxides may be excessively formed on the surface layer during the batch annealing to deteriorate spot weldability after the hot press forming.

When the maintenance time at the heating temperature is less than an hour, it may be difficult for the plating layer to be sufficiently alloyed. When the maintenance time at the heating temperature is greater than 100 hours, productivity may be reduced.

Cooling after the batch annealing is not necessarily limited, and may be furnace cooling, air cooling, or the like.

In this case, the batch annealing may be performed in a non-oxidation atmosphere. For example, the batch annealing may be performed in a hydrogen atmosphere or a hydrogen-nitrogen mixed atmosphere.

The non-oxidation atmosphere may be maintained during the batch annealing to prevent spot weldability from being deteriorated by excessive formation of oxides on a coil surface. In addition, a batch annealing facility may be oxidized in the oxidation atmosphere to increase facility maintenance costs and to reduce lifespan of the batch annealing facility.

Hot Press Formed Part Having Excellent TWB Welding Characteristics

According to another aspect of the present disclosure, a hot press formed part having excellent TWB welding characteristics may be manufactured by hot press-forming a tailor welded blank, manufactured by welding an Al—Fe alloy plated steel sheet of the present disclosure to a steel sheet having a thickness or strength different from a thickness or strength of the Al—Fe alloyed plate steel sheet. The hot press formed part may have tensile strength of 1300 MPa or more and a welding zone hardness deviation of 100 Hv or less.

When the hardness deviation of the welding zone is greater than 100 Hv, fracture may occur in the welding zone to deteriorate TWB welding characteristics.

In this case, a microstructure of the hot press formed part is not necessarily limited when tensile strength of the hot press formed part is greater than 1300 MPa. However, in the hot press formed part, a microstructure of an Al—Fe alloy plated steel sheet may include martensite or bainite as a main phase and retained austenite in an amount of 30 area % or less to increase ductility of the hot press formed part, and may include ferrite in an amount of 5 area % or less. When the amount of ferrite is greater than 5 area, strength may be decreased, and impact resistance and impact toughness may be decreased because cracking easily propagates along a ferrite network.

Method of Manufacturing Hot Press Formed Part Having Excellent TWB Welding Characteristic According to another aspect of the present disclosure, a method of manufacturing a hot press formed part having excellent TWB welding characteristics may include a TWB manufacturing step in which a tailor welded blank is manufactured by welding an Al—Fe alloy plated steel sheet, manufactured by the above-described method of manufacturing an Al—Fe alloy plated steel sheet, to a steel sheet having a thickness or strength different from a thickness or strength of the Al—Fe alloy plated steel sheet, a heating step in which the tailor welded blank is heated to a temperate within the range of (Ae3+30° C.) to (Ae3+150° C.) at a heating rate of 1 to 1000° C./sec and then maintained for 1 to 1000 seconds, and a hot press forming step in which the heated tailor welded blank is press-formed and, simultaneously, cooled at a cooling rate of 1 to 1000° C./sec.

TWB Manufacturing

A tailor welded blank is manufactured by welding an Al—Fe alloy plated steel sheet, manufactured by the above-described method of manufacturing an Al—Fe alloy plated steel sheet, to a steel sheet having a thickness or strength different from a thickness or strength of the Al—Fe alloy plated steel sheet.

In this case, since the effects of the present disclosure are achieved as long as a difference in thicknesses between steel sheets is a conventional thickness difference applied to manufacturing of a tailor welded blank, the steel sheets having different thicknesses are not necessarily limited. For example, steel sheets having a thickness difference of 1 to 10 mm may be used.

In addition, since the effects of the present disclosure are achieved when steel sheets having different strengths are conventional steel sheets used to manufacture a tailor welded blank, the steel sheets having different strengths are not necessarily limited.

As an example, HSLA steel, DP steel, or the like, may be used in a conventional steel sheet for manufacturing a tailor welded blank.

As a more detailed example, a 6Mn6 steel material may be used as a conventional steel sheet for manufacturing a tailor welded blank. The 6Mn6 steel material refers to a steel sheet including, by weight percentage (wt %), C: 0.05 to 0.08%, Si: 0.01 to 0.4%, Mn: 0.08 to 1.7%, Al: 0.01 to 0.07%, Ti: 0.09% or less, a balance of iron (Fe), and unavoidable impurities.

Furthermore, a welding method is not necessarily limited and may be laser welding, electric arc welding, plasma welding, metal inert gas (MIG) welding, or the like.

TWB Heating

The tailor welded blank is heated to a temperate within the range of (Ae3+30° C.) to (Ae3+150° C.) at a heating rate of 1 to 1000° C./sec and then maintained for 1 to 1000 seconds.

When the heating temperature is lower than Ae3+30° C., there is a high possibility that ferrite will be generated during transfer from a heating furnace to a mold, and thus, it may be difficult to secure predetermined strength. When the heating temperature is higher than Ae3+150° C., excessive oxides may be formed on a surface of the hot press formed part to make it difficult to secure spot weldability.

When the heating rate is less than 1° C./sec, it may be difficult to ensure sufficient productivity and excessive heating time may be required. Therefore, a grain size of the steel sheet is so large that impact toughness may be reduced, and excessive oxides may be formed on the surface of the hot press formed part to reduce spot weldability. On the other hand, when the heating rate is greater than 1000° C./sec, expensive equipment may be required to increases manufacturing costs.

When the maintenance time is less than 1 second, a uniform temperature may not be achieved, and some carbides may be insufficiently redissolved to cause a material difference for each portion. When the maintenance time is greater than 1000 seconds, excessive oxides may be formed on the surface of the hot press formed part to make it difficult to secure spot weldability, similarly to the excessive heating temperature.

Hot Press Forming

The heated tailor welded blank may be press-formed and, simultaneously, cooled at a cooling rate of 1 to 1000° C./sec.

When a cooling rate is less than 1° C./sec, ferrite may be generated to make it difficult to secure high strength. Relatively expensive special cooling equipment may be required to control the cooling rate to be greater than 1000° C./sec, which causes manufacturing costs to be increased.

Therefore, according to an example embodiment, a plated steel sheet for hot press forming having excellent TWB welding characteristics due to uninform hardness of a welding zone without removal of a plating layer when a tailor welded blank is manufactured, a hot press formed part, and methods of manufacturing the same may be provided.

MODE FOR INVENTION

Hereinafter, the present disclosure will be described more specifically by way of examples. It should be noted that the following examples are intended to illustrate the present disclosure in more detail and to not limit the scope of the present disclosure. The scope of the present disclosure may be determined by the matters described in the claims and the matters reasonably deduced therefrom.

Example

A slab having a component composition, illustrated in the following table 1, was heated to a temperature of 1100° C., and then finishing hot-rolled at temperature of 900° C. and coiled at a temperature of 650° C. The coiled slab was dipped in a plating bath including, by weight percentage (wt %), Si: 8%, Fe: 2%, a balance of Al, and unavoidable impurities, and then batch-annealed under conditions listed in the following table 2. Thus, an Al—Fe alloy plated steel sheet was manufactured.

An Al—Fe alloy layer of the Al—Fe alloy plated steel sheet was analyzed and listed in the following table 2.

In addition, an experiment was conducted as to whether delamination occurred in a plating layer of the Al—Fe alloy plated steel sheet, and results thereof were listed in the following table 2. The delamination of the plating layer was determined by performing V-shaped bending on the Al—Fe alloy plated steel sheet at a radius of curvature of 3 mm to have an internal angle of 60°, attaching a transparent tape to the bent portion, and detaching the transparent tape from the plated layer to observe whether delamination occurred in the plating layer, with naked eye.

A tailor welded blank was manufactured by laser-welding the Al—Fe alloy plated steel sheet to a 6Mn6 steel material (a steel sheet including, by wt %, C: 0.06%, Si: 0.1%, Mn: 1.5%, Al: 0.03%, Ti: 0.05%, a balance of Fe, and unavoidable impurities), and then heated to a temperature of 900° C. and maintained for 6 minutes. Then, the tailor welded blank was hot-press formed with a flat mold to manufacture a hot press formed part.

A tensile test, a welding zone tensile test, and a welding zone hardness test of the hot press formed part were performed. In the case of the hardness test, 10 points were analyzed in a ¾ t region at a plate thickness of ¼ t of the welding zone part by performing a micro Vickers test at a load of 100 g.

A hardness deviation of the welding zone was measured as a value obtained by subtracting minimum hardness of the welding zone from average hardness of the welding zone.

Spot weldability was expressed as O when a welding current range, measured by an ISO 18278-2 method, was 1 kA or more and expressed as X when the welding current range was less than 1 kA.

TABLE 1

| | | | | | | Alloy Composition (wt %) | | | | | | | |
|---|---|---|---|---|---|---|---|---|---|---|---|---|---|
| ST | C | Si | Mn | P | S | Al | N | B | Cr | Mo | Ti | Nb | V |
| A | 0.23 | 0.2 | 1.3 | 0.01 | 0.002 | 0.03 | 0.004 | 0.002 | 0.15 | — | 0.035 | — | — |
| B | 0.15 | 0.01 | 3 | 0.009 | 0.003 | 0.02 | 0.005 | 0.002 | 0.3 | — | 0.03 | — | — |
| C | 0.13 | 1.4 | 7 | 0.009 | 0.002 | 0.04 | 0.004 | — | 1 | 0.3 | 0.023 | — | — |
| D | 0.35 | 0.6 | 1.1 | 0.01 | 0.001 | 0.035 | 0.006 | — | 0.3 | — | — | — | 0.2 |
| E | 0.22 | 0.2 | 1.1 | 0.011 | 0.002 | 0.04 | 0.006 | 0.003 | 0.2 | — | 0.03 | 0.06 | 0.2 |
| F | 0.25 | 0.3 | 0.2 | 0.008 | 0.001 | 0.03 | 0.005 | 0.003 | 3 | — | 0.032 | 0.08 | — |
| G | 0.21 | 0.1 | 0.9 | 0.009 | 0.003 | 0.032 | 0.005 | 0.002 | — | 0.3 | 0.032 | — | — |
| H | 0.07 | 0.5 | 1 | 0.009 | 0.002 | 0.037 | 0.005 | 0.002 | 0.1 | — | 0.003 | 0.03 | — |
| I | 0.23 | 0.5 | 0.05 | 0.008 | 0.003 | 0.031 | 0.006 | 0.003 | — | 0.2 | 0.03 | — | — |

ST: Steel Type

15

TABLE 2

| | | | | | | | Al—Fe Alloy Layer | | | | | |
|---|---|---|---|---|---|---|---|---|---|---|---|---|
| | | Batch Annealing Condition | | | | | Al | | Unalloyed | | $T_{SOL}$ | |
| No. | ST | ATMOS | T | t | HR | EQA1 | (wt %) | $T_{SUM}$ | (area %) | DELAM | (μm) | Note |
| 1 | A | — | — | — | — | — | 88 | 0.1 | 98 | X | 0.01 | CE |
| 2 | | H₂ | 450 | 12 | 50 | 0.1 | 74.1 | 0.7 | 45 | O | 0.01 | CE |
| 3 | | H₂ | 500 | 18 | 50 | 0.4 | 67.8 | 0.9 | 21 | O | 0.03 | CE |
| 4 | | H₂ | 550 | 10 | 50 | 0.9 | 62.1 | 0.6 | 2.8 | O | 0.07 | CE |
| 5 | | H₂ | 600 | 24 | 50 | 3.0 | 53.2 | 3.2 | 0 | X | 0.23 | IE |
| 6 | | H₂ | 650 | 12 | 50 | 5.2 | 55.4 | 3.7 | 0 | X | 0.26 | IE |
| 7 | | N₂ + H₂ | 600 | 2 | 100 | 1.2 | 59.2 | 0.9 | 0.7 | O | 0.11 | CE |
| 8 | | N₂ + H₂ | 650 | 12 | 50 | 5.2 | 54.2 | 3.9 | 0 | X | 0.21 | IE |
| 9 | | air | 650 | 12 | 50 | 5.2 | 53.8 | 2.8 | 0 | X | 2.18 | CE |
| 10 | | H₂ | 650 | 12 | 100 | 4.8 | 56.7 | 2.9 | 0.4 | X | 0.36 | IE |
| 11 | | H₂ | 650 | 12 | 5 | 10.1 | 52.1 | 5.5 | 0 | X | 0.75 | IE |
| 12 | | H₂ | 650 | 12 | 1 | 20.7 | 43.5 | 11.3 | 0 | X | 0.90 | CE |
| 13 | | H₂ | 650 | 24 | 50 | 6.8 | 51.5 | 3.7 | 0.2 | X | 0.51 | IE |
| 14 | | H₂ | 750 | 6 | 50 | 17.1 | 47 | 9.3 | 0 | X | 0.85 | IE |
| 15 | | H₂ | 750 | 15 | 50 | 22.7 | 41.6 | 12.3 | 0 | X | 1.10 | IE |
| 16 | B | H₂ | 650 | 12 | 50 | 5.2 | 55.8 | 2.8 | 0 | X | 0.35 | IE |
| 17 | C | H₂ | 650 | 12 | 50 | 5.2 | 53.2 | 2.9 | 0 | X | 0.31 | IE |
| 18 | D | N₂ + H₂ | 650 | 12 | 50 | 5.2 | 49.6 | 3.7 | 0 | X | 0.36 | IE |
| 19 | | H₂ | 800 | 1 | 50 | 24.3 | 43.5 | 13.2 | 0 | X | 0.94 | CE |
| 20 | E | H₂ | 650 | 12 | 50 | 5.2 | 55.7 | 2.9 | 0 | X | 0.29 | IE |
| 21 | F | H₂ | 650 | 12 | 50 | 5.2 | 54.2 | 3.1 | 0 | X | 0.24 | IE |
| 22 | G | H₂ | 700 | 6 | 50 | 8.8 | 52.1 | 4.8 | 0 | X | 0.33 | IE |
| 23 | | H₂ | 550 | 3 | 50 | 0.6 | 62.3 | 1.3 | 3 | X | 0.08 | CE |
| 24 | H | H₂ | 650 | 12 | 50 | 5.2 | 53.7 | 3.9 | 0 | X | 0.31 | CE |
| 25 | I | H₂ | 650 | 12 | 50 | 5.2 | 56.4 | 4.0 | 0 | X | 0.25 | CE |

ST: Steel Type
ATMOS: Atmosphere
EQUA1: Equation 1
$T_{SUM}$: Sum of thicknesses of diffusion layer and intermediate layer
DELAM: Whether delamination occurred in plating layer
$T_{SOL}$: Thickness of surface oxide layer
CE: Comparative Example
IE: Inventive Example In Table 2, Equation 1 is expressed as follows:

$$100000 * \sqrt{232.9 \times \left(t + 0.4 \times \frac{T}{HR}\right) \times \exp\left(\frac{-25860}{273 + T}\right)}$$

In Table 2 and Equation 1, T denotes a heating temperature (° C.), t denotes maintenance time at a heating temperature (hours), and HR denotes a heating rate (° ° C./hour).

In Table 2, a thickness of a surface oxide layer refers to a thickness to a point, in which oxygen concentration is 10 wt %, in an oxygen concentration profile obtained through glow discharge spectrometer (GDS) analysis.

An average thickness value of each of a diffusion layer, formed on a surface of a base steel sheet and constituting a layer while including Si in an amount of 0.5 to 12.0 wt %, and an intermediate layer, formed in the Al—Fe alloy layer and constituting a layer while including Si in an amount of 3.0 to 20.0 wt %, were obtained, and the average thickness values were summed and listed in Table 2.

In Table 2, regarding whether delamination occurred in the plating layer, "O" means that delamination occurred in the plating layer, and "X" means that delamination did not occur in the plating layer.

TABLE 3

| No. | Hot press formed part | | | | | TWB Characteristics | | | | |
| | YS (MPa) | TS (MPa) | EL (%) | SW | CM (6Mn6) Plating | HWZ (Hv) | HWZ$_{MIN}$ (Hv) | HDWZ (Hv) | Fracture Position | Note |
|---|---|---|---|---|---|---|---|---|---|---|
| 1 | 1065 | 1508 | 6.4 | ○ | Al-plating | 342 | 165 | 177 | Welding Zone | CE |
| 2 | 1071 | 1517 | 6.2 | ○ | Non-plating | 335 | 178 | 157 | Welding Zone | CE |
| 3 | 1071 | 1509 | 6.4 | ○ | Non-plating | 338 | 200 | 138 | Welding Zone | CE |
| 4 | 1059 | 1511 | 6.5 | ○ | Non-plating | 342 | 232 | 110 | Welding Zone | CE |
| 5 | 1054 | 1496 | 6.8 | ○ | Non-plating | 341 | 299 | 42 | Base material | IE |
| 6 | 1065 | 1504 | 6.4 | ○ | Al-plating | 335 | 311 | 24 | Base material | IE |
| 7 | 1072 | 1512 | 6 | ○ | Al-plating | 346 | 251 | 95 | Base material | CE |
| 8 | 1066 | 1501 | 6.7 | ○ | Non-plating | 339 | 287 | 52 | Base material | IE |
| 9 | 1032 | 1499 | 6.1 | X | Non-plating | 320 | 291 | 29 | Base material | CE |
| 10 | 1069 | 1519 | 6.2 | ○ | Non-plating | 345 | 284 | 61 | Base material | IE |
| 11 | 1047 | 1500 | 6.6 | ○ | Non-plating | 332 | 308 | 24 | Base material | IE |
| 12 | 1034 | 1493 | 6.5 | X | Al-plating | 339 | 314 | 25 | Base material | CE |
| 13 | 1028 | 1485 | 6.7 | ○ | Non-plating | 341 | 297 | 44 | Base material | IE |
| 14 | 1025 | 1481 | 6.6 | ○ | Al-plating | 329 | 305 | 24 | Base material | IE |
| 15 | 1011 | 1468 | 6.7 | X | Non-plating | 335 | 299 | 36 | Base material | CE |
| 16 | 1023 | 1578 | 5.8 | ○ | Non-plating | 374 | 310 | 64 | Base material | IE |
| 17 | 1103 | 1630 | 7.8 | ○ | Non-plating | 395 | 318 | 77 | Base material | IE |
| 18 | 1387 | 2015 | 5.6 | ○ | Non-plating | 545 | 473 | 72 | Base material | IE |
| 19 | 1345 | 1967 | 5.3 | X | Non-plating | 545 | 480 | 65 | Base material | CE |
| 20 | 1075 | 1543 | 6.8 | ○ | Non-plating | 341 | 308 | 33 | Base material | IE |
| 21 | 1121 | 1597 | 6.2 | ○ | Non-plating | 375 | 319 | 56 | Base material | IE |
| 22 | 1064 | 1499 | 6.9 | ○ | Al-plating | 354 | 295 | 59 | Base material | IE |
| 23 | 1064 | 1508 | 6.5 | ○ | Al-plating | 358 | 24 | 117 | Welding Zone | CE |
| 24 | 756 | 1102 | 14.2 | ○ | Non-plating | 283 | 252 | 31 | Base material | CE |
| 25 | 889 | 1265 | 8.1 | ○ | Non-plating | 294 | 244 | 50 | Base material | CE |

SW: Spot Weldability
CM: Connection Material
HWZ: Hardness of Welding Zone
HWZ$_{MIN}$: Minimum Hardness of Welding Zone
HDWZ: Hardness Deviation of Welding Zone
CE: Comparative Example
IE: Inventive Example In the case of inventive examples satisfying the conditions of the present disclosure, tensile strength of 1300 MPa or more may be secured after hot press forming, a fraction of an unalloyed phase of the Al—Fe alloy layer was 1 areas or less, and the content of Al included in the Al—Fe alloy layer was 40 to 60% and an Al-rich phase was not formed in the welding zone during TWB welding, so that a hardness deviation of a TWB welding zone after the hot press forming was 100 Hv or less. According to a result of a tensile test of the welding zone, it was confirmed that TWB welding characteristics were excellent because fracture occurred in a 6Mn6 base material portion without fracture of the welding zone. In the case of inventive examples satisfying the conditions of the present disclosure, it was also confirmed that delamination did not occur in the plating layer before hot press forming.

In the case of No. 1 (a comparative example), TWB welding characteristics were deteriorated because batch annealing was not performed.

In the cases of Nos. 2 to 4 (comparative examples), a value of Equation 1 was less than 1, a fraction of an unalloyed phase was greater than 1 area %, an Al-rich phase remained in a welding zone during the TWB welding due to the presence of a low-melting-point Al phase to low-strength phase after the hot press forming. Accordingly, a hardness deviation of the TWB welding zone was greater than 100 Hv and a result of a tensile test of the welding zone was that fracture occurred in the welding zone.

In the cases of Nos. 2 to 4 and 7 (comparative examples), delamination occurred in a plating layer before hot press forming because a sum of average thicknesses of a diffusion layer and an intermediate layer was 1 µm or less.

In the case of No. 9 (a comparative example), batch annealing was performed in an air atmosphere, and thus, a thickness of a surface oxide layer formed during batch annealing was increased to deteriorate spot weldability of a hot press formed part.

In the cases of Nos. 12, 15, and 19 (comparative examples), value of Equation 1 was greater than 20, and thus, thicknesses of a diffusion layer and an intermediate layer having poor weldability was increased to deteriorate spot weldability of a hot press formed part.

In the cases of Nos. 24 and 25, TWB welding characteristics and spot weldability were excellent. However, the content of C or Mn was less than the range of the present disclosure, so that tensile strength of a hot press formed part was less than 1300 MPa.

Figure 2:
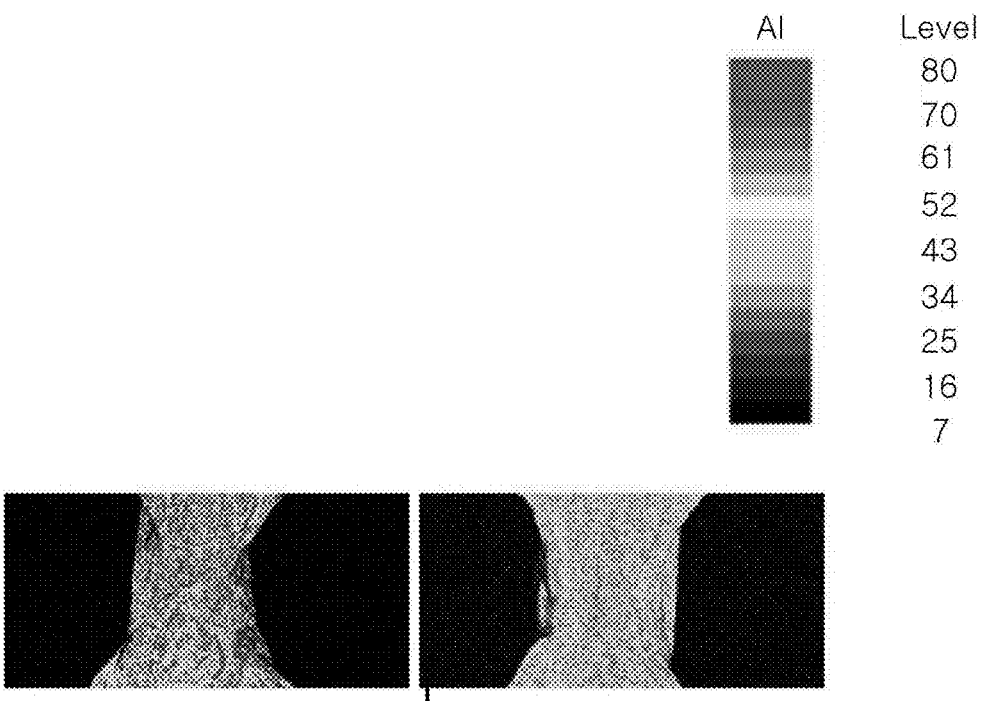
FIG. 2 illustrates results of Al-distribution EPMA analysis for TWB welding zones of hot press formed parts of Test Nos. 1 and 6.

FIG. 1 is a graph illustrating a relationship between Equation 1 and a hardness deviation of a TWB welding zone. As can be seen from FIG. 1, TWB welding characteristics were excellent when Equation 1 satisfied the range of the present disclosure FIG. 2 illustrates results of Al-distribution EPMA analysis for TWB welding zones of hot press formed parts of Test Nos. 1 and 6. In the case of No. 1 (a comparative example), it was confirmed that phases (red) with high content of Al are non-uniformly distributed in a TWB welding zone. In the case of No. 6, the content of Al was uniform in a welding zone.

Figure 3:
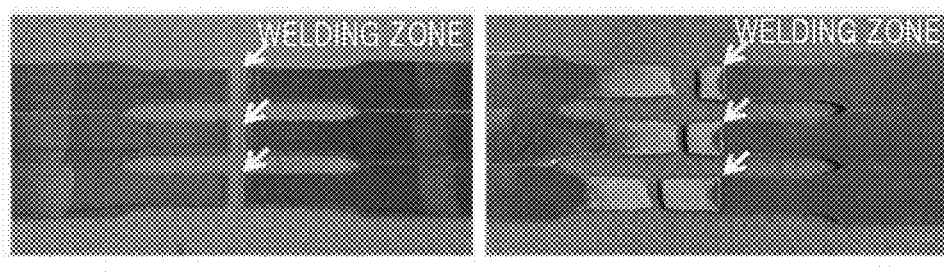
FIG. 3 is an image obtained by capturing a fracture shape of a tensile test on hot press formed parts of Test Nos. 1 and 6.

FIG. 3 is an image obtained by capturing a fracture shape of a tensile test on hot press formed parts of Test Nos. 1 and 6. In the case of No. 1 (a comparative example), a facture position was a welding zone. In the case of No. 6 (comparative example), a fracture position was a base material and TWB welding characteristics were excellent.

While the present disclosure has been described in detail with reference to the examples, the present disclosure may be embodied in many different forms. Accordingly, the technical idea and the scope of claims set forth below are not limited to the preferred examples.

The invention claimed is:

1. A hot press formed part comprising:
a base steel; and
an Al—Fe alloy layer disposed on the base steel,
wherein the Al—Fe alloy layer comprises a diffusion layer disposed on the base steel and an intermediate layer disposed on the diffusion layer,
wherein the diffusion layer comprises, by weight percentage, Si in an amount of 0.5 to 12.0%,
wherein the intermediate layer comprises, by weight percentage, Si in an amount of 3.0 to 20.0%, and
wherein a sum of average thicknesses of the diffusion layer and the intermediate layer is 1.0 to 9.3 µm.

2. The hot press formed part of claim 1, wherein the Al—Fe alloy layer comprises, by wt %, Al in an amount of 40 to 60%.

3. The hot press formed part of claim 1, wherein a fraction of an unalloyed phase of the Al—Fe alloy layer is 1 area % or less.

4. The hot press formed part of claim 1, wherein the hot press formed part comprises an oxide layer on the Al—Fe alloy layer, and a thickness of the oxide layer is 2 µm or less.

5. The hot press formed part of claim 1, wherein a thickness of the Al—Fe alloy layer is 10 to 60 µm.

6. The hot press formed part of claim 1, wherein a microstructure of the base steel comprises, by an area fraction, martensite or bainite as a main phase, 30% or less of retained austenite, and 5% or less of ferrite.

7. The hot press formed part of claim 1, wherein the base steel comprises, by weight percentage, carbon (C): 0.1 to 0.5%, silicon (Si): 0.01 to 2.0%, manganese (Mn): 0.1 to 10%, phosphorus (P): 0.001 to 0.05%, sulfur (S): 0.0001 to 0.02%, aluminum (Al): 0.001 to 1.0%, nitrogen (N): 0.001 to 0.02%, a balance of iron (Fe), and unavoidable impurities.

8. The hot press formed part of claim 1, wherein the base steel comprises one or more of chromium (Cr) and molybdenum (Mo) in total amount of 0.01 to 4.0 wt %.

9. The hot press formed part of claim 1, wherein the base steel comprises one or more of titanium (Ti), niobium (Nb), and vanadium (V) in total amount of 0.001 to 0.4 wt %.

10. The hot press formed part of claim 1, wherein the base steel comprises boron (B) in amount of 0.0001 to 0.01 wt %.

11. A hot press formed part comprising:
a base steel;
an Al—Fe alloy layer disposed on the base steel; and
an welding zone,
wherein the Al—Fe alloy layer comprises a diffusion layer disposed on the base steel and an intermediate layer disposed on the base steel,
wherein the diffusion layer comprises, by weight percent, Si in an amount of 0.5 to 12.0%,
wherein the intermediate layer comprises, by weight percent, Si in an amount of 3.0 to 20.0%,
wherein a sum of average thicknesses of the diffusion layer and the intermediate layer is 1.0 to 9.3 µm, and
wherein a hardness deviation of the welding zone is 100 Hv or less.

12. The hot press formed part of claim 11, wherein the Al—Fe alloy layer comprises, by wt %, Al in an amount of 40 to 60%.

13. The hot press formed part of claim 11, wherein a fraction of an unalloyed phase of the Al—Fe alloy layer is 1 area % or less.

14. The hot press formed part of claim 11, wherein the hot press formed part comprises an oxide layer on the Al—Fe alloy layer, and a thickness of the oxide layer is 2 µm or less.

15. The hot press formed part of claim 11, wherein a thickness of the Al—Fe alloy layer is 10 to 60 µm.

16. The hot press formed part of claim 11, wherein a microstructure of the base steel comprises, by an area fraction, martensite or bainite as a main phase, 30% or less of retained austenite, and 5% or less of ferrite.

17. The hot press formed part of claim 11, wherein the base steel comprises, by weight percentage, carbon (C): 0.1 to 0.5%, silicon (Si): 0.01 to 2.0%, manganese (Mn): 0.1 to 10%, phosphorus (P): 0.001 to 0.05%, sulfur (S): 0.0001 to 0.02%, aluminum (Al): 0.001 to 1.0%, nitrogen (N): 0.001 to 0.02%, a balance of iron (Fe), and unavoidable impurities.

18. The hot press formed part of claim 11, wherein the base steel comprises one or more of chromium (Cr) and molybdenum (Mo) in total amount of 0.01 to 4.0 wt %.

19. The hot press formed part of claim 11, wherein the base steel comprises one or more of titanium (Ti), niobium (Nb), and vanadium (V) in total amount of 0.001 to 0.4 wt %.

20. The hot press formed part of claim 11, wherein the base steel comprises boron (B) in amount of 0.0001 to 0.01 wt %.

* * * * *